United States Patent
Yang et al.

(10) Patent No.: US 11,827,794 B2
(45) Date of Patent: *Nov. 28, 2023

(54) NANOCARBONS IN CARBON BLACK, CARBON FIBERS AND CARBON BLACK, AND METHODS OF FORMING A COMPOSITION BY CO-PROCESSING NANOCARBON AGGREGATES AND CARBON BLACK AGGREGATES

(71) Applicant: HYPERION CATALYSIS INTERNATIONAL, INC., Cambridge, MA (US)

(72) Inventors: Jun Yang, Bedford, MA (US); Howard Tennent, Kennett Square, PA (US); Robert Hoch, Hensonville, NY (US)

(73) Assignee: Hyperion Catalysis International, Rockville, MD (US)

( * ) Notice: Subject to any disclaimer, the term of this patent is extended or adjusted under 35 U.S.C. 154(b) by 84 days.

This patent is subject to a terminal disclaimer.

(21) Appl. No.: 16/757,537

(22) Filed: Apr. 20, 2020

(65) Prior Publication Data

US 2021/0230430 A1    Jul. 29, 2021

Related U.S. Application Data

(63) Continuation of application No. 15/557,574, filed as application No. PCT/US2016/021791 on Mar. 10, 2016, now Pat. No. 10,633,544.

(60) Provisional application No. 62/133,255, filed on Mar. 13, 2015.

(51) Int. Cl.
| | | |
|---|---|---|
| C09C 1/60 | (2006.01) | |
| C08K 3/04 | (2006.01) | |
| C08K 9/02 | (2006.01) | |
| C09C 1/56 | (2006.01) | |
| B82Y 40/00 | (2011.01) | |
| B82Y 30/00 | (2011.01) | |

(52) U.S. Cl.
CPC ............ *C09C 1/60* (2013.01); *C08K 3/04* (2013.01); *C08K 3/041* (2017.05); *C08K 9/02* (2013.01); *C09C 1/56* (2013.01); *B82Y 30/00* (2013.01); *B82Y 40/00* (2013.01); *C01P 2004/03* (2013.01); *C01P 2004/50* (2013.01); *Y10S 977/742* (2013.01); *Y10S 977/753* (2013.01); *Y10S 977/842* (2013.01)

(58) Field of Classification Search
CPC .............. C09C 1/56; C09C 1/60; C08K 9/02
See application file for complete search history.

(56) References Cited

U.S. PATENT DOCUMENTS

| | | | |
|---|---|---|---|
| 10,633,544 B2 * | 4/2020 | Yang | .............. C08K 3/041 |
| 2014/0272596 A1 * | 9/2014 | Yamamoto | ........... H01M 4/625 |
| | | | 429/232 |

* cited by examiner

*Primary Examiner* — Edward J Cain
(74) *Attorney, Agent, or Firm* — Laura Lee (57) ABSTRACT

Provided herein is a method of forming a composition by co-processing nanocarbon aggregates and carbon black aggregates, which includes providing nanocarbon aggregates, providing carbon black aggregates, and mixing the nanocarbon aggregates and the carbon black aggregates such that the nanocarbon aggregates disperse into looser aggregates of nanocarbons and carbon black, or individualized nanocarbons dispersed among the carbon black aggregates.

22 Claims, 8 Drawing Sheets

NANOCARBONS IN CARBON BLACK, CARBON FIBERS AND CARBON BLACK, AND METHODS OF FORMING A COMPOSITION BY CO-PROCESSING NANOCARBON AGGREGATES AND CARBON BLACK AGGREGATES

CROSS-REFERENCE TO RELATED APPLICATIONS

This application is a continuation of U.S. patent application Ser. No. 15/557,574, filed Mar. 10, 2016, which issued as U.S. Pat. No. 10,633,544, which is a national stage application of PCT Patent Application No. PCT/US16/21791, which claims the benefits of U.S. Provisional Application Nos. 62/133,256 filed on Mar. 13, 2015, and 62/177,212 filed on Mar. 10, 2015, each of which is incorporated by reference.

SUMMARY

Provided herein is a method of dispersing nanocarbons into carbon black. In examples discussed below, nanocarbons, such as nanotubes, graphene, buckyballs, nanohorns, etc., and carbon black can be mixed together to facilitate integration of nanocarbons and carbon black. The mixture of nanocarbons and carbon black can assist in dispersion of the nanocarbons into the carbon black, and also assist in dispersion of the mixture of the nanocarbons and carbon black within a medium, such as an elastomer.

Also provided herein is a method of dispersing nanocarbons and carbon black into a polymer, such as rubber or a thermoplastic. This method can include pre-processing the nanocarbons and carbon black into "loosened" aggregates, and then combining the loosened aggregates with the polymer. By combining the loosened aggregates with the polymers, improved properties of the nanocarbon-carbon black-polymer product can be achieved.

BRIEF DESCRIPTION OF THE DRAWINGS

The accompanying drawings, which are incorporated and constitute a part of this specification, illustrate example embodiments of the claimed invention. In the drawings.

FIGS. 3-16 are SEM micrographs of samples of co-processed nanocarbons and carbon black under different conditions.

DETAILED DESCRIPTION

The following detailed description refers to the accompanying drawings. The same reference numbers in different drawings may identify the same or similar elements. Also, the following detailed description describes embodiments of the invention and is not intended to limit the invention.

A. Overview

While not wishing to be bound by any theory, it is believed that carbon black within carbon black agglomerates, which has primary particles in the same size range as individual nanocarbons in nanocarbon agglomerates, is able to affix itself via electrostatic or mechanical forces (because of its irregular structure) to the individual nanocarbons. These forces cause the individual nanocarbons to de-agglomerate from their original nanocarbon aggregates. Once de-agglomerated, the individualized nanocarbons are of a particular size that is able to fit within an interstitial space between the individual carbon black particles and agglomerates, such that the carbon black keeps individual nanocarbons apart from other individual nanocarbons. In other words, it is believed that the close contact between the nanocarbons and carbon black, as well as the shear forces acting within a small area provided by physical co-processing, causes the de-agglomeration and maintenance of individuality of the individualized nanocarbons.

B. Nanocarbons

The term "nanocarbons" is intended to refer to nano-sized carbons, which can include carbon nanotubes, nanographenic carbons, buckyballs and nanohorns. Carbon nanotubes are a preferred form of nanocarbon.

In general, the use of prefix "nano," as used in nanocarbons and nanographenic carbons, implies that at least one dimension of the material is less than 100 nm, and can include material on the size scale of at least one dimension being less than 1 micron, less than 0.5 microns, less than 0.2 microns, less than 100 nm, less than 50 nm, less than 20 nm, or less than 5 nanometers. Nanocarbons generally also have desirable properties, such as, high surface area and electrical conductivity; see, for example, basic properties of carbon nanotubes.

Nanocarbons can exist in a variety of forms and can be prepared through the catalytic decomposition of various carbon-containing gases at metal surfaces. These include those described in U.S. Pat. No. 6,099,965 to Tennent, et al. and U.S. Pat. No. 5,569,635 to Moy, et al., both of which are hereby incorporated by reference in their entireties.

In an embodiment, nanocarbons can be made by catalytic growth from hydrocarbons or other gaseous carbon compounds, such as CO, mediated by supported or free floating catalyst particles.

As produced, nanocarbons may be in the form of discrete nanocarbons (i.e., separated individual nanocarbons), aggregates/agglomerates of nanocarbons (i.e., dense, entangled nanocarbons), or a mixture of both. Aggregates of nanocarbons may be dense particulate structures of entangled nanocarbons.

Aggregates can be formed during the production of nanocarbons, where the morphology of the aggregate can be influenced by the choice of catalyst support. Porous supports with completely random internal texture, e.g., fumed silica or fumed alumina, can grow nanocarbons in all directions leading to the formation of aggregates.

As used herein, nanocarbon agglomerates are composed of multiple nanocarbon aggregates, which adhere to one another or otherwise form a unitary agglomeration of numerous aggregates. Nanocarbon aggregates can retain their structure in nanocarbon agglomerates.

Nanocarbons also differ physically and chemically from other forms of carbon such as standard graphite and carbon black. Standard graphite is, by definition, flat shaped rather than fibrous. Carbon black is an amorphous structure of irregular shape, generally characterized by the presence of both sp2 and sp3 bonding. On the other hand, nanocarbons have one or more layers of ordered graphitic carbon atoms. These differences, among others, make graphite and carbon black poor predictors of nanocarbon-polymer structure properties.

One form of nanocarbon is a carbon nanotube. The terms "carbon nanotube," "fibril," "nanofibers," and "nanotube" are used interchangeably to refer to single wall (i.e., only a single graphene layer parallel to the nanotube axis) and/or multi-wall (i.e., more than one graphene layer more or less parallel to the nanotube axis) carbon nanotubes, which may additionally be functionalized or have an outer layer of less structured amorphous carbon (note, other forms of nanocarbons can also be functionalized if desired).

Carbon nanotubes have an elongated structure with a cross-section (e.g., angular fibers having edges) or a diameter (e.g., rounded) of, for example for multi-wall carbon nanotubes, less than 100 nm, preferably less than 50 nm, more preferably less than 20 nm; or, for example for single wall nanotubes, less than 5 nanometers. Other types of carbon nanotubes are also known, such as fishbone fibrils (e.g., wherein the graphene sheets are disposed in a herringbone pattern with respect to the nanotube axis), "buckytubes," etc.

Aggregates of carbon nanotubes may resemble the morphology of bird nest ("BN"), cotton candy ("CC"), combed yarn ("CY"), open net ("ON"), or other conformations. Carbon nanotubes may also be grown on a flat support, attached by one end to the support and parallel to each other, forming a "forest" structure.

Individual carbon nanotubes in aggregates may be oriented in a particular direction (e.g., as in "CC," "CY," and "ON" aggregates) or may be non-oriented (i.e., randomly oriented in different directions, for example, as in "BN" aggregates). "BN" structures may be prepared as disclosed in U.S. Pat. No. 5,456,897, for example, which is hereby incorporated by reference in its entirety. "BN" agglomerates are tightly packed with typical densities of greater than 0.08 g/cc, for example, 0.12 g/cc. Transmission electron microscopy ("TEM") reveals no true orientation for carbon nanotubes formed as "BN" agglomerates. Patents describing processes and catalysts used to produce "BN" agglomerates include U.S. Pat. Nos. 5,707,916 and 5,500,200, both of which are hereby incorporated by reference in their entireties.

Figure 1A:
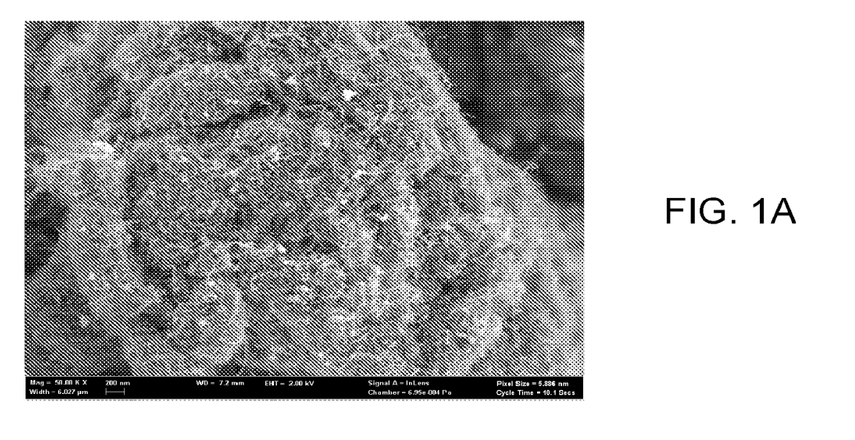
FIGS. 1A-1B are scanning electron microscope (SEM) micrographs of carbon nanotubes.
Figure 1B:
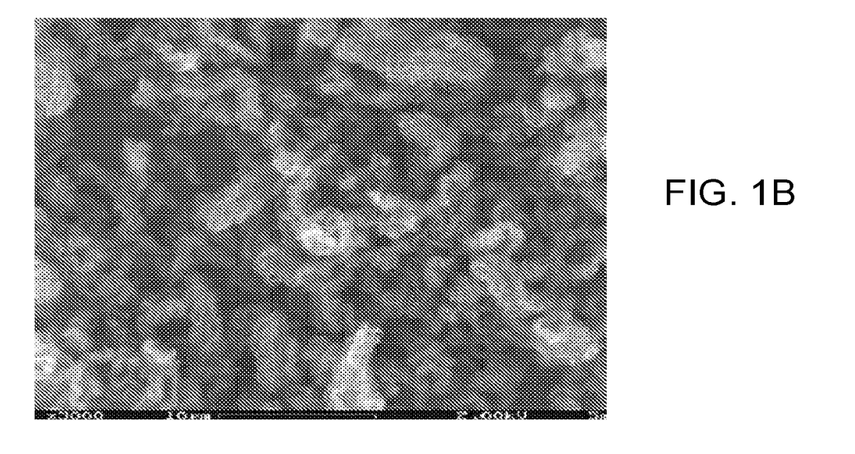

FIGS. 1A and 1B are SEM micrographs of carbon nanotubes. As illustrated in FIGS. 1A and 1B, carbon nanotubes (BN type in FIG. 1A and CC type in FIG. 1B) show carbon nanotube agglomerate structures. As made carbon nanotube agglomerates have not been successfully de-agglomerated in a dry state. Rather, de-agglomeration in this context indicates either the creation of substantial numbers of individualized tubes or the essentially complete absence of the as-made agglomerates. Even de-agglomeration in a liquid phase can require the use of substantial energy sources, such as ultrasound. See U.S. Pat. No. 5,691,054, which is co-owned and incorporated herein by reference.

On the other hand, "CC," "ON," and "CY" agglomerates have lower density, typically less than 0.1 g/cc, for example, 0.08 g/cc and their TEMs reveal a preferred orientation of the nanotubes. U.S. Pat. No. 5,456,897, hereby incorporated by reference in its entirety, describes the production of these oriented agglomerates from catalyst supported on planar supports. "CY" may also refer generically to aggregates in which the individual carbon nanotubes are oriented, with "CC" aggregates being a more specific, low density form of "CY" aggregates.

Carbon nanotubes are distinguishable from commercially available so called "continuous carbon fibers" (i.e., commercially available, larger than nanotube-sized carbon fibers). For instance, the diameter of continuous carbon fibers, which is always greater than 1.0 micron and typically 5 to 7 microns, is also far larger than that of carbon nanotubes, which is usually less than 1.0 micron. Due to their smaller size, carbon nanotubes often have increased conductivity than carbon fibers for the same amount provided as additive to polymers.

Carbon nanotubes, as used herein, may be used in their as-made agglomerated form, or they may be pre-treated by, for example, mortar and pestle, ball mill, rod mill, hammer mill, etc. to reduce the maximum size of the agglomerates. Additionally, the as-made nanotubes maybe washed in a strong acid or strong base to dissolve any catalyst and support from which the carbon nanotubes are grown, such as, for example, phosphoric acid.

Another form of nanocarbon is nanographenic carbon. The term "nanographenic carbons" is intended to refer to nano-sized carbons, which can include carbons having nanoscale and graphenic structure. For example, nanographenic carbons can include graphite of a nanoscopic scale, but would not include graphite of macroscopic scale. One type of nanographenic carbon, graphene, or graphite nanoparticles, can be described as one or more sheets of graphitic carbon. For example, graphene can include a single sheet of graphitic carbon, or nanoplatelets with a few sheets of carbon. Graphene can be on the same order of size as carbon nanotubes, as mentioned above, with a structure having a dimension in one direction of less than 1 micron, less than 0.5 microns, less than 0.2 microns, less than 100 nm, less than 50 nm, less than 20 nm, or less than 5 nanometers.

Another form of nanocarbon is a buckyball. Buckyballs, also known as buckminsterfullerenes, are carbons arranged in a spherical structure resembling a ball. Buckyballs are made of 60 carbon atoms and have a dimension on the order of 1 to 2 nm.

Another form of nanocarbon is a nanohorn. Nanohorns are horn-shaped aggregates of stacks of graphene sheets. Carbon nanotubes, both single and multi-wall are included within the category of nanohorns, as they are made of one or more graphene sheets. Nanohorns also have a structure having a dimension in one direction of less than 1 micron, less than 0.5 microns, less than 0.2 microns, less than 100 nm, less than 50 nm, less than 20 nm, or less than 5 nanometers.

C. Carbon Black

The term "carbon black" is intended to include a carbon powder with carbon aggregates of various sizes. In general, carbon black aggregates can be difficult to disperse due to its strong attractions between adjacent particles. Due to the difficulty in dispersing carbon black particles from carbon black aggregates, carbon black particles have been subjected to similar treatment to nanocarbons for dispersion, such as shear mixing within a medium, dry shearing, and wet shearing, as mentioned above concerning nanocarbons.

Carbon blacks are named according to an ASTM standard used by all manufacturers. Carbon blacks can also be characterized by their porosity. Carbon black porosity is discussed in *Porosity in Carbons*, Patrick, J. W. ed., Halsted Press 1995, which is hereby incorporated by reference.

Discussion of dispersion of carbon black agglomerates can be found, for example, in the literature. See Pomchaitawarda et al., "Investigation of the dispersion of carbon black agglomerates of various sizes in simple-shear flows," Chem. Eng. Sci. 58 (2003), pp. 1859-1865.

Figure 2A:
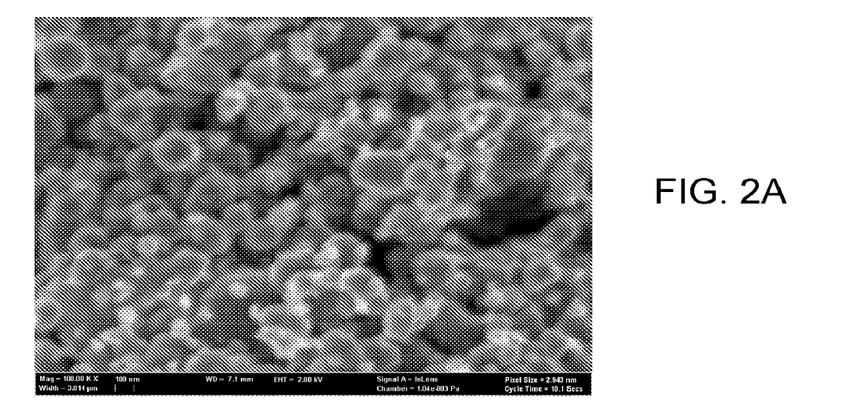
FIGS. 2A-2B are SEM micrographs of carbon black.
Figure 2B:
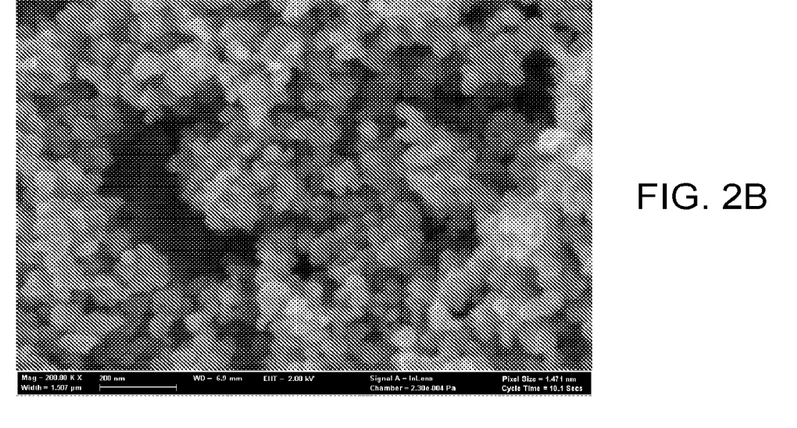

FIGS. 2A and 2B are SEM micrographs of carbon black from different sources. FIG. 2A is Cabot Sterling 1120 carbon black as supplied from Cabot Corporation, Boston, Mass. at 100,000× magnification. FIG. 2B is Continental Carbon N330 as supplied from Continental Carbon Company, Houston, Tex. at 200,000× magnification. As shown in FIGS. 2A and 2B, the carbon black as supplied are aggregated.

D. Co-Processed Nanocarbons and Carbon Black

Co-processed nanocarbons and carbon black were prepared at varying concentrations, as well as using different methods to facilitate co-processing. By co-processing nanocarbons and carbon black, dispersion of nanocarbon aggregates into carbon black aggregates can be observed. Specifically, co-processing can result in looser nanocarbon aggregates and individualized nanocarbons, as further discussed below.

In embodiments provided below, compositions of the mixtures of nanocarbons and carbon black can vary from 0.001 wt. % to 99.999 wt. % nanocarbons (with 99.999 wt. % to 0.001 wt. % carbon black). For example, 2 wt. % to 50 wt. % nanocarbons can provide dispersion of nanocarbons in carbon black, such as 50 wt. % or less nanocarbon aggregates and 50 wt. % or more carbon black aggregates, 30 wt. % or less nanocarbon aggregates and 70 wt. % or more carbon black aggregates, or 10 wt. % or less nanocarbon aggregates and 90 wt. % or more carbon black aggregates. As another example, 5 wt. % to 50 wt. % nanocarbons can provide individualization of nanocarbons in carbon black.

In U.S. Pat. No. 8,771,630, which is hereby incorporated by reference, Wu et al. describe graphene and a method for the preparation of graphene. In this patent, graphene dispersion is discussed, as is graphene generally.

In a paper by Singh, et al., "Polymer-Graphene Nanocomposites: Preparation, Characterization, Properties, and Applications," *Nanocomposites—New Trends and Developments*, Ebrahimi, F. (Ed.), InTech (2012), which is hereby incorporated by reference, Singh et al. further discuss carbon allotropes, such as graphite, diamond, fullerene, and carbon nanotube. Singh et al. discuss that "the fabrication of single-layer graphene is difficult at ambient temperature . . . [because] graphene sheets with a high surface area tend to form irreversible agglomerates and restacks to form graphite through p-p stacking and Vander Waals interactions." See, p. 38 middle of the first full paragraph. Singh et al. further discuss methods of forming graphene. See also Li, et al., "Processable aqueous dispersions of graphene nanosheets," Nature Nanotechnology, 3 (2), (2008) 101-105, which is hereby incorporated by reference; and Park et al., "Hydrazine-reduction of graphite- and graphene oxide," Carbon 49 (2011) 3019-3023, which is also hereby incorporated by reference.

As discussed below, by co-processing nanocarbons in carbon black, aggregates can be disrupted, and individual nanocarbons can be observed in a SEM.

While not wishing to be bound by theory, it is believed that co-processing of nanocarbons and carbon blacks can lead initially to loosening of the nanocarbon aggregates. The loosening of the nanocarbon aggregates can appear to be "cloud"-like large, loosened aggregates that can be observable in a SEM. Further processing can convert these loosened aggregates into individual nanocarbons, which can also be observed in a SEM. These loosened aggregates can have a nanocarbon to nanocarbon distance greater than that of the starting material's nanocarbon to nanocarbon distance. For example, in carbon nanotube loosened aggregates, carbon nanotubes can be separated by a distance of about 10 nanotubes or about 100 nm, as observed in the samples discussed below.

For example, in carbon nanotube aggregates, these "cloud"-like co-processed carbon nanotube-carbon black may be differentiated from the starting as-made carbon nanotube aggregates by the separation of the carbon nanotubes from other carbon nanotubes within a carbon nanotube-carbon black aggregate.

Co-processing of nanocarbons and carbon black may be carried out in a dry state or a wet state. Dry state co-processing may be preferred as the process may require fewer steps due to the addition and removal of liquid. Wet state co-processing, on the other hand, may be preferred if the nanocarbons, carbon black, or both are provided in wetted form. For example, if carbon nanotubes and carbon black are provided in wetted form, co-processing in a wet state may require fewer steps, and may be preferable.

In the case of wet pre-processing, the nanocarbon and carbon black may be added to the liquid in any order or the liquid may be added to the nanocarbon and carbon black again in any order. The quantity of liquid employed may range from 0.10 lbs. to 100 lbs. of liquid per lb. of mixed solids depending on the type of pre-processing equipment to be used. Any liquid may be used, but water is a preferred liquid. Organic liquids as well as supercritical media, such as supercritical $CO_2$, may also be used. After pre-processing most of the added liquid may be readily removed, such as via decanting, from the processed solids. Final liquid removal is preferably by volatilizing residual liquid from the solids.

Dry co-processing can be carried out in any type of equipment or combination of such equipment used for intimately mixing dry powders, such as ball mills, both tumbling and stirred, rod mills, mortar and pestles, Banbury mixers, two and three roll mills, Waring blenders and similar stirred equipment, both with and without the presence of added media.

Wet co-processing can employ any of the types of equipment used for dry pre-processing as well as jet mills, including microfluidizers, and agitated vessels of any sort with any type of impeller.

Depending on the intended use of the nanocarbon-carbon black mixture the individualization step may take place in the co-processing step just described or it may occur in a subsequent compounding step in the presence of polymer or other material. This compounding step may be carried out in any of the known types of equipment used for compounding additives into polymers including extruders, such as twin screw extruders and single screw extruders, Banbury mixers, Brabender mixers, two and three roll mills, etc.

Also in embodiments provided below, dispersion methods, such as physical mixing can be utilized to disperse nanocarbons in carbon black. For example, mortar and pestle (hand or motorized), shakers (with or without media added), and tumblers (with or without media) are discussed below in the embodiments, but other mechanical means can be also be used.

Table summarizes some examples of co-processing nanocarbons and carbon blacks. As shown in the Table below, the nanocarbon source and morphology, the carbon black and morphology, the ratio of nanocarbon to carbon black, the type of equipment, the mixing parameters, such as time, intensity, etc., can affect the resulting co-processed nanocarbon-carbon black products.

TABLE

| Sample | Figure | Composition | Device | Time |
|---|---|---|---|---|
| 1 | Not shown | 10% graphene in N330 | Motorized mortar and pestle (M&P) | 30 min. |
| 2 | Not shown | 5% graphene in N330 | Steel tumbler with Polyamide (PA) 12 media | 4 hrs. at 120 rpm |
| 3 | 3 | 10% Ground CC + 1120 | Shaker | 4 hrs. |

TABLE-continued

| Sample | Figure | Composition | Device | Time |
|---|---|---|---|---|
| 4 | 4 | 10% Ground CC + 1120 | Hand M&P | 1 hr. |
| 5 | 5 | 10% CC + 1120 | Shaker | 1 hr. |
| 6 | 6 | 10% BN + 1120 | Plastic tumbler with PA 12 | 4 hrs. |
| 7 | 7 | 10% Ground CC + 1120 | Plastic tumbler with PA 12 | " |
| 8 | 8A, 8B | 30% Ground CC + 1120 | Hand M&P | 30 min. |
| 9 | 9 | 5% BN + 1120 | Plastic tumbler with PA 12 | " |
| 10 | 10 | 2% BN + 1120 | Plastic tumbler with PA 12 | " |
| 11 | 11 | 5% CC + N330 | Plastic tumbler with PA 12 | " |
| 12 | Not shown | 5% BN + 1120 | Ceramic "rod mill" | 2 hrs. at 60 rpm |
| 13 | Not shown | 10% BN + N330 | Steel tumbler with PA 12 | 4 hrs. at 120 rpm |
| 14 | Not shown | 10% BN + N330 | Teflon tumbler with steel media | 2 hrs. at 120 rpm |
| 15 | 12 | 5% CC + N330 | Teflon tumbler with steel media | 2 hrs. at 120 rpm |
| 16 | 13 | 30% BN + N330 | Teflon tumbler with steel media | 2 hrs. at 120 rpm |
| 17 | 14 | 10% BN + N330 | Waring blender | 10 min. |
| 18 | 15 | 10% BN + N330 | Sample 17, motorized M&P | 10 min. |
| 19 | Not shown | 10% BN + N330 | Brabender mixer | 1 hr. |
| 20 | 16 | 10% BN + N330 | Wet in 3 roll mill | 5 passes |

Sample 1 is formed from 10% graphene in N330 with 0.30 g of as-received xGnP® graphene nanoplatelets (Grade M, XG Sciences, Inc.) is mixed with 2.70 g of carbon black N330 (Columbian Chemicals Co.). The mixture is ground with a motorized mortar and pestle (Model: Retsch, Brinkmann, Type: RMO) for 30 min.

Sample 2 is formed from 5% graphene in N330 by mixing 0.10 g of as-received xGnP® graphene nanoplatelets (Grade M, XG Sciences, Inc.) with 1.90 g of carbon black N330 (Columbian Chemicals Co.). The mixture is loaded to a tumbler made from steel pipe equipped with a baffle along with 10 g of PA12 (polyamide 12) granules (2-6 mm OD) as grinding media and tumbled with a roller (Model: Tru-Square Metal Products) at 120 rpm for 4 hrs.

Examination of the samples 1 and 2 in a SEM reveals that the graphene nanoplatelets are well dispersed in carbon black. Individual nanoplatelets can be observed in each of samples 1 and 2 within the SEM.

Sample 3 is formed by combining of 0.10 g carbon nanotubes (CC conformation; previously ground in a Fitzpatrick hammer mill, herein after referred to as "ground CC") and 0.90 g Cabot Sterling 1120 carbon black in a stainless steel cylinder. The cylinder was shaken at high frequency with a Retsch Brinkmann Shaker at the setting of 60 for 4 hrs.

Figure 3:
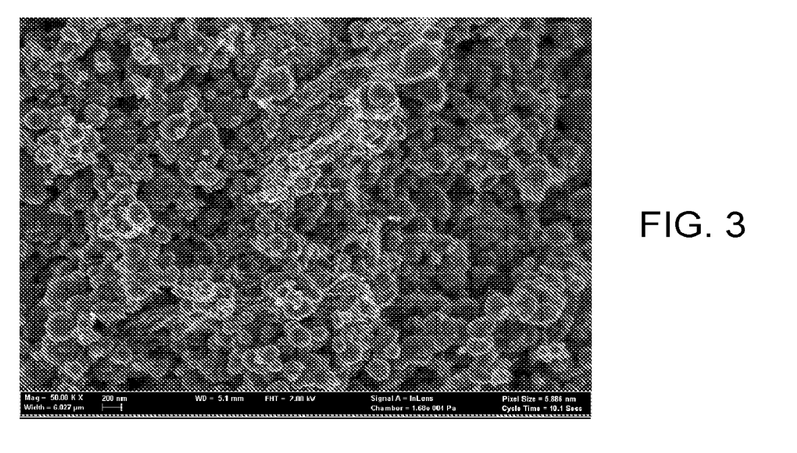

FIG. 3 is a SEM micrograph of sample 3 at 50,000× magnification showing numerous individual nanotubes and loosened aggregates. The agglomerate structure of the carbon black appears to be essentially unchanged.

Sample 4 is formed by co-processing 0.10 g of as made ground carbon nanotube powder with 0.90 g of Cabot Sterling NS 1120 carbon black by hand grinding with mortar and pestle at room temperature for 1 hr. Samples were prepared for the SEM by the procedure used in sample 3.

Figure 4:
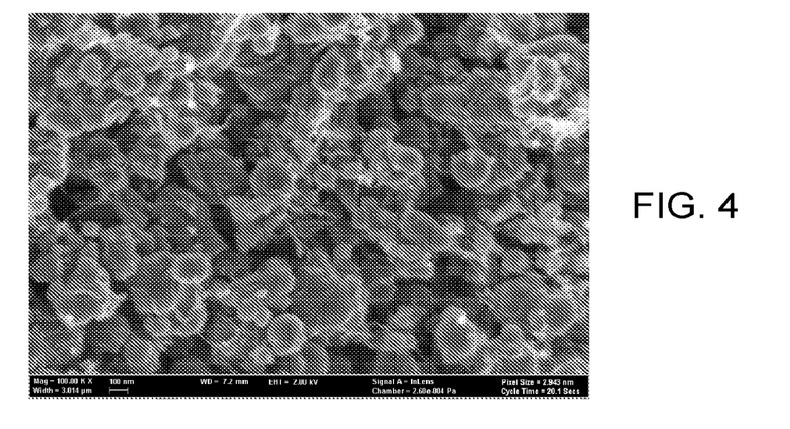

FIG. 4 is a SEM micrograph of sample 4 at 100,000× magnification of the co-processed carbon nanotube powder and carbon black. As shown in FIG. 4, numerous individualized carbon nanotubes are observable because the carbon nanotubes are dispersed in the carbon black.

Sample 5 is formed by co-processing 0.1 g of as made CC carbon nanotubes and 0.90 g Cabot Sterling 1120 carbon black under the same conditions (equipment and time) as sample 3.

Figure 5:
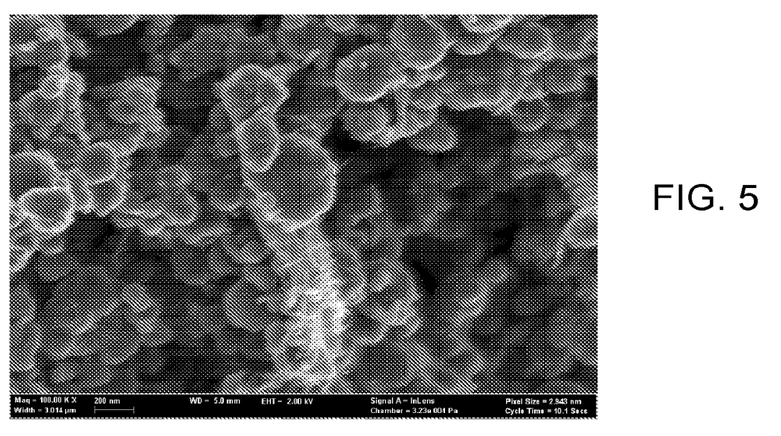

FIG. 5 is a SEM micrograph of sample 5 at 100,000× magnification showing a loosened aggregate that appears to be a "cloud"-like structure over a half a micron long, and about 200 nm wide.

Sample 6 is formed by co-processing 0.1 g as made BN carbon nanotubes and 0.90 g Cabot Sterling 1120 carbon black in a plastic tumbler with irregular spherical (2-6 mm OD) PA 12 media therein at 120 rpm for 4 hrs.

Figure 6:
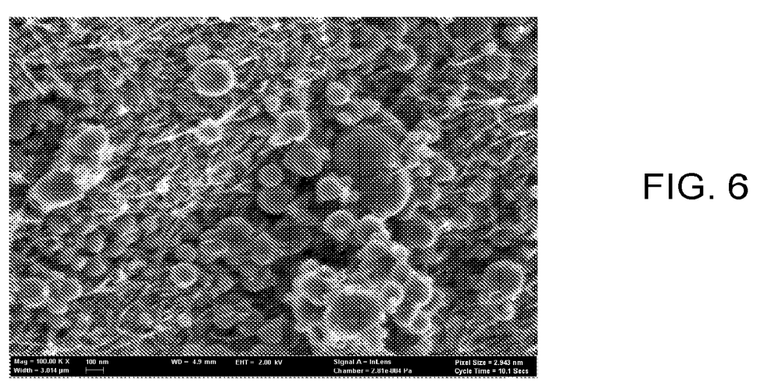

FIG. 6 is a SEM micrograph of sample 6 at 100,000× magnification showing numerous loosened carbon nanotube aggregates.

Sample 7 is formed by co-processing 0.1 g of as made ground CC carbon nanotubes and 0.90 g Cabot Sterling 1120 carbon black under the same conditions as sample 6.

Figure 7:
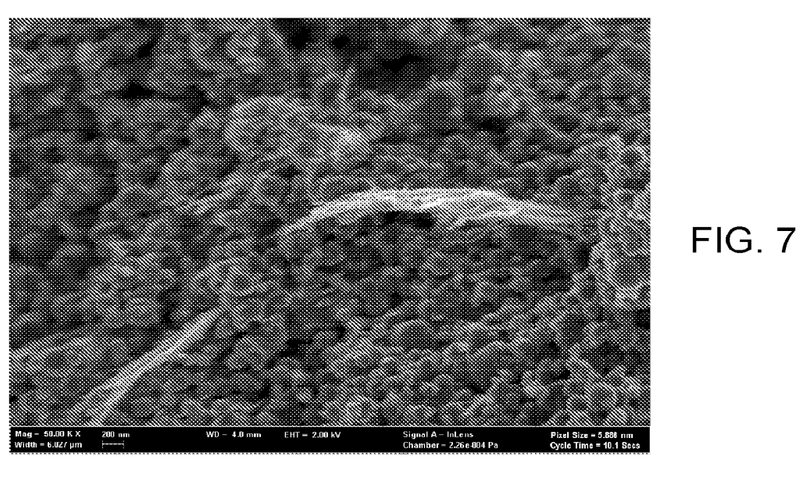

FIG. 7 is a SEM micrograph of sample 7 at 50,000× magnification showing the presence of loosened aggregates with "cloud"-like structures over a micron in length.

Sample 8 is formed by co-processing 0.3 g of as made CC carbon nanotubes and 0.70 g Cabot Sterling 1120 carbon black by hand grinding using a mortar and a pestle for 30 minutes.

Figure 8A:
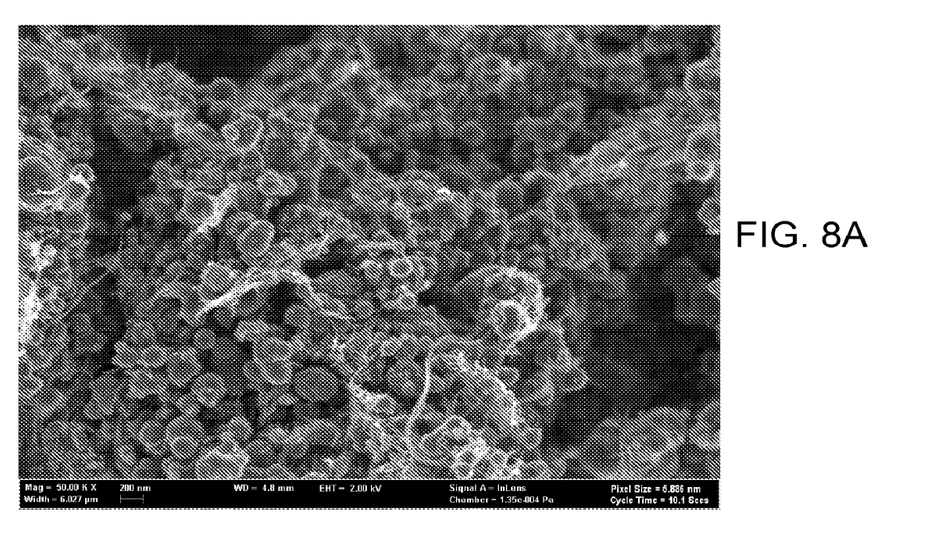
Figure 8B:
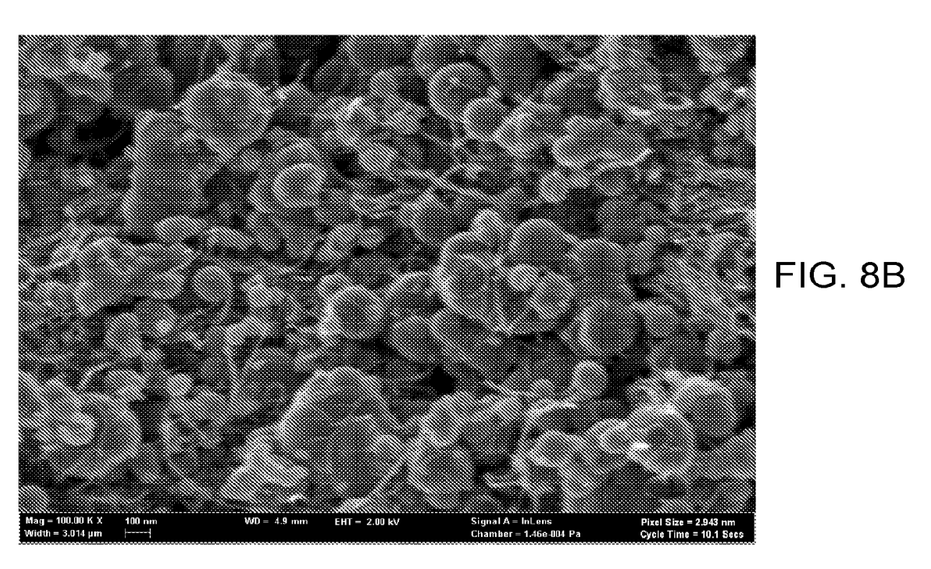

FIGS. 8A-8B are SEM micrographs of sample 8 at different magnifications. As shown in FIG. 8A, numerous loosened aggregates are present at 50,000× magnification. As shown in FIG. 8B, numerous individual nanotubes are shown at 100,000× magnification. As before the structure of the carbon black aggregate seems unchanged.

Sample 9 is formed by co-processing 0.05 g BN carbon nanotubes with 0.95 g Cabot Sterling 1120 carbon black, and sample 10 is formed by co-processing 0.02 g BN carbon nanotubes with 0.98 g Cabot Sterling 1120 carbon black using a plastic tumbler with PA12 media therein at 120 rpm for 4 hrs.

Figure 9:
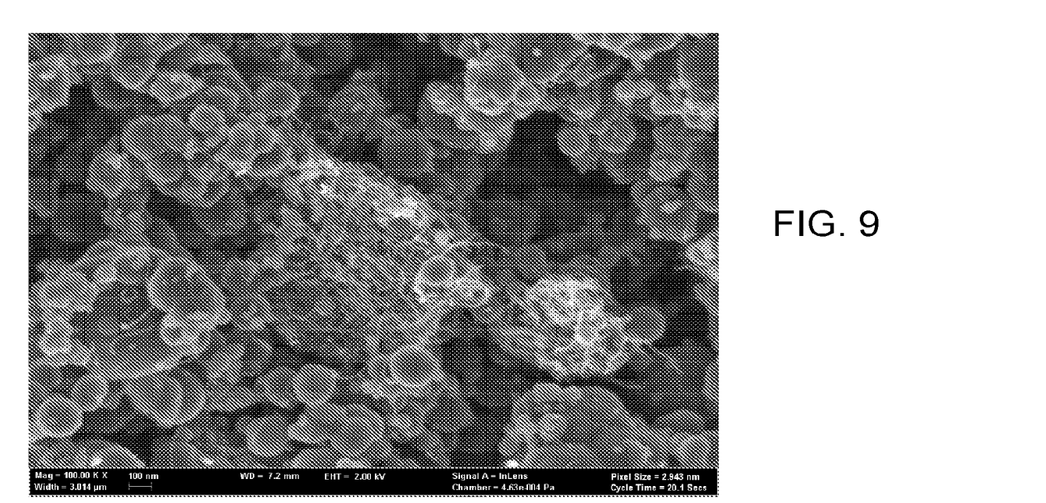
Figure 10:
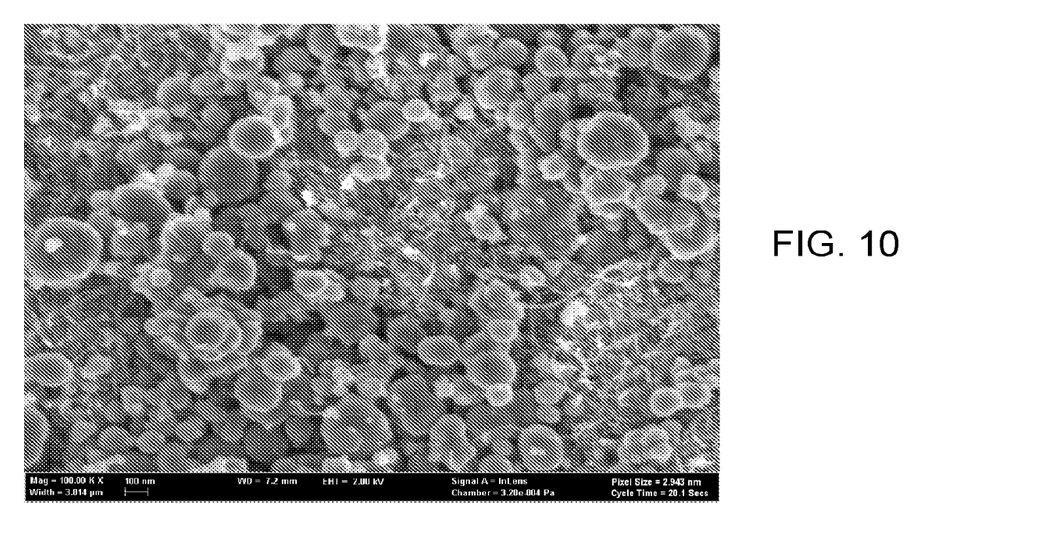

FIGS. 9 and 10 are SEM micrographs of samples 9 and 10, respectively, illustrate individual nanotubes and loosened aggregates at 100,000× magnification.

Figure 11:
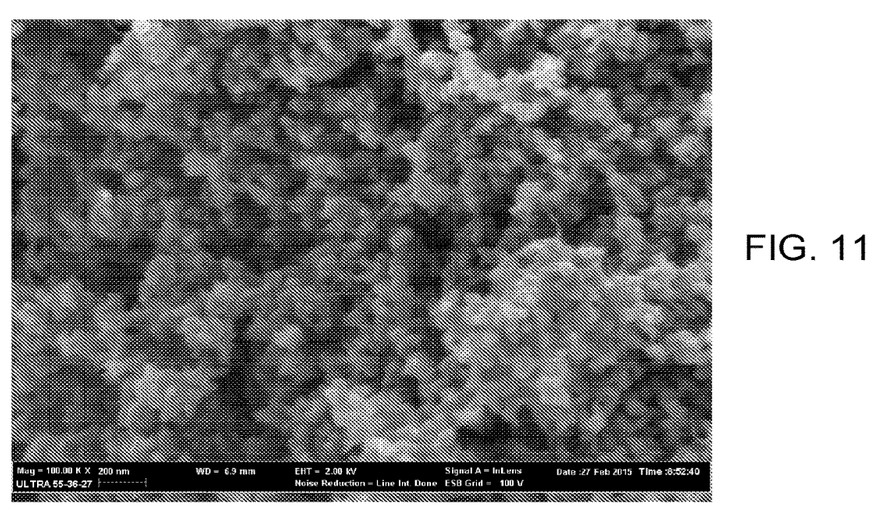

Sample 11 is formed by co-processing 0.10 g CC carbon nanotubes and 1.90 g Continental N330 carbon black by hand grinding using a mortar and pestle for 30 min. Again, individual nanotubes are observed at 100,000× magnification, as shown in FIG. 11.

Sample 12 is formed by co-processing 2.50 g of as-made BN carbon nanotubes with 47.50 g of Cabot Sterling 1120 carbon black. The mixture is loaded in a ceramic jar together with ceramic rods for tumbling at 60 rpm for 2 hrs (the volume of the small marshmallow-like rods is about half of the jar volume). Shortened nanotubes are observed (not shown).

Sample 13 is co-processed by tumbling with a steel pipe equipped with a baffle. A mixture of 2.0 g 10 wt. % BN in carbon black N330 (Columbian) was charged into the pipe along with 10 g of PA12 granules. The tumbler was rolled at 120 rpm for 4 hours. The SEM image of sample 13, which is not provided, displayed a similar set of individual nanotubes as those of Samples 9 and 10 (FIGS. 9 and 10) with no agglomerates observed.

Sample 14 is co-processed by loading 2.0 g of 10 wt. % BN in carbon black N330 was charged to a Teflon bottle along with stainless steel balls (⅛" OD) (the volume of the steel ball is about 50% of the bottle volume) and tumbled at 120 rpm for 2 hrs. At 100,000× magnification, the presence of individual tubes and no agglomerates was observed similar to FIGS. 9 and 10, and thus are not provided. The carbon black aggregate structure appeared unchanged.

Sample 15 is co-processed from 0.05 g CC carbon nanotubes and 0.95 g of carbon black N330 (Columbian) by mixing together in a mortar and pestle for 30 minutes.

Figure 12:
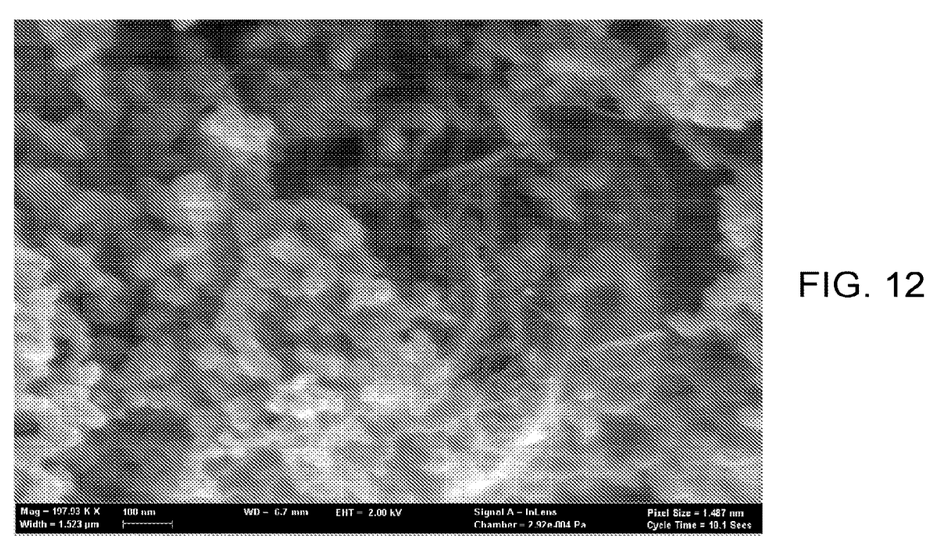

FIG. 12 is a SEM micrograph of sample 15 at 198,000× magnification shows the presence of both individual nanotubes and loosened aggregate structures approaching a micron in length. The carbon black aggregate structure appears unchanged.

Sample 16 is co-processed from 0.3 g of BN carbon nanotubes and 0.7 g of carbon black N330 by hand grinding the combination in a mortar and pestle for 30 minutes.

Figure 13:
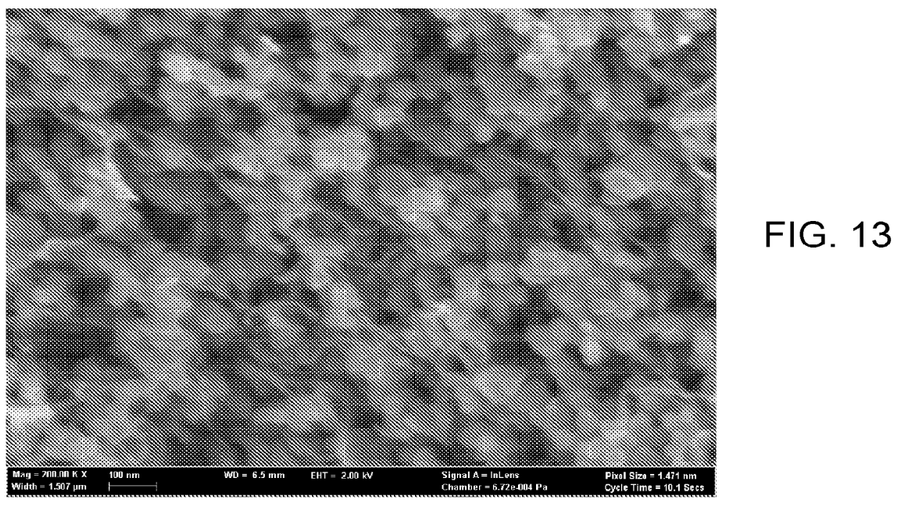

FIG. 13 is a SEM micrograph of sample 16 at 200,000× magnification. Individualized nanotubes are prominent and no aggregates are seen. Carbon black aggregate structure appears unchanged.

Sample 17 is co-processed by adding 5 g of as made BN powder and 45 g of N330 carbon black to a Waring Blender (Model: Blender 7012G, made by Waring Commercial, Torrington, Conn.) and processing at the lowest speed for 10 minutes. Density was measured as 0.39 g/cc.

Figure 14:
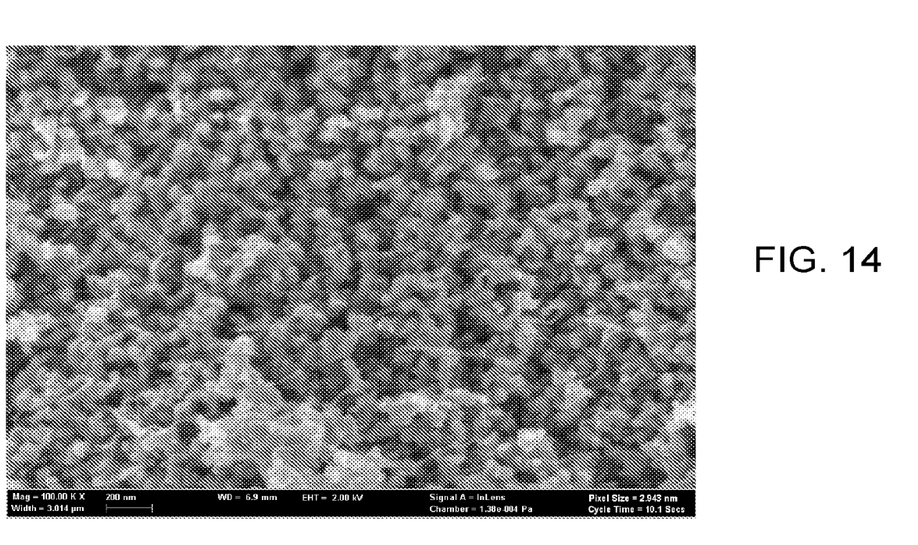

FIG. 14 is a SEM micrograph of sample 17 at 100,000× magnification and shows individualized carbon nanotubes in a carbon black aggregate structure, which appears unchanged.

Sample 18 was co-processed by first processing 5 g of as made BN powder and 45 g of N330 carbon black together in a Waring blender for 10 minutes at low speed (as was done in sample 17). The resulting mixture was then transferred to a motorized mortar and pestle and further processed for 10, 20 and 30 minutes to finalize the co-processed material. Tap density falls in 10 minutes to 0.31 g/cc. at 20 minutes of processing a sample is withdrawn and prepared for microscopy as previously.

Figure 15:
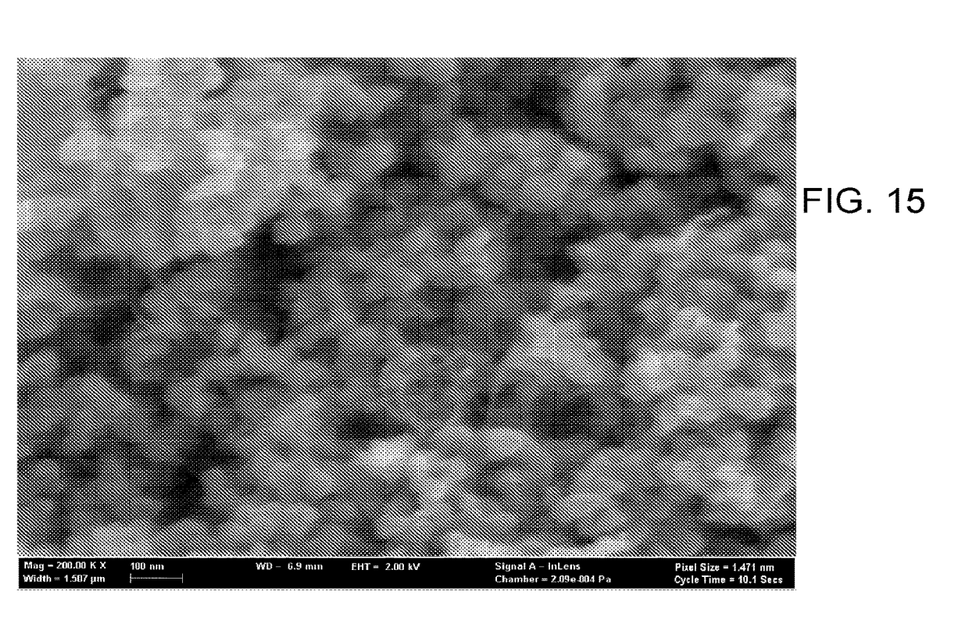

FIG. 15 is a SEM micrograph of sample 18 after 20 minutes of further processing at 200,000× magnification showing the presence of individual nanotubes in a carbon black aggregate structure, which appears unchanged.

Sample 19 was co-processed by lightly mixing with a spatula 10 wt. % as made BN nanotubes and 90 wt. % N330 carbon black. 19 g of the mixture is transferred to the twin screw mixing head of a Brabender mixer (Model: Plasti-Corder DR-2052-K13, manufactured by C.W. Brabender Instruments, Inc., So. Hackensack, N.J.) designed to simulate the action of a Banbury-type mixer. The mixture is processed at 100 rpm for one hour. Tap density falls to 0.28 g/cc. Both individualized nanotubes and loosened aggregates are observed. As sample 19 appeared similar to sample 18 (FIG. 14), sample 19's SEM micrograph is not provided.

Sample 20 is prepared by mixing 5.0 g of the 10 wt. % BN/N330 mix prepared in sample 19 above with 7 g of deionized water to form a wet paste material. The wet paste material is passed five times through a three roll mill (Model: Keith 27502, manufactured by Keith Machinery Corp., Lindenhurst, N.Y.), which results in a thin film, which in turn is dried at 100° C. in vacuum oven.

Figure 16:
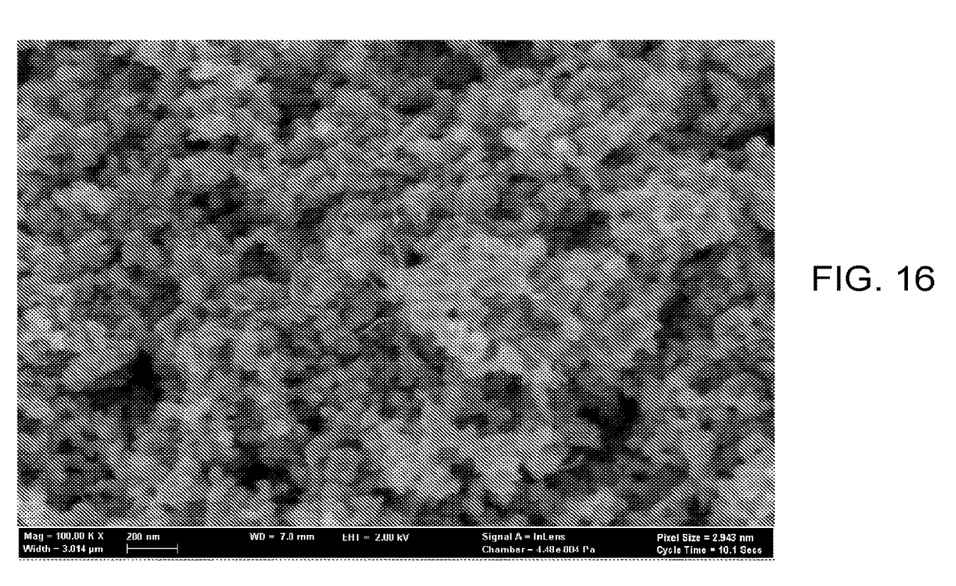

FIG. 16 is a SEM micrograph of sample 20 at 100,000× magnification, which shows the presence of individual nanotubes.

As shown herein, co-processed nanocarbons and carbon black can provide loosened aggregates and/or individualized nanocarbons, such as individualized carbon nanotubes. These loosened aggregates and/or individualized nanocarbons can be used to provide improved dispersion of nanocarbons and/or carbon black in a matrix, such as polymers or other materials. Suitable matrix materials include polymers, both organic and inorganic, metals, ceramics, and other non-polymer matrices, such as asphalt, cement, or glass. Example polymers include thermosets, such as vulcanizeable rubber, polyurethanes, epoxy resins, polyimides, etc., or thermoplastics, such as polyolefins, acrylics, nylons, polycarbonates, etc. Combining polymers with the co-processed nanocarbons and carbon black can provide improved properties in polymers, such as improved modulus, elongation, etc.

One of ordinary skill in the art would expect the presence of individualized nanotubes and the absence of large tight aggregates to lead to composites with improved properties, such as tensile modulus, toughness, hardness, durometer, resistance to explosive delamination, tear resistance, relaxation time, etc., without sacrifice of elongation to break.

In addition to the co-processed nanocarbons and carbon black in a matrix, additional additives, such as inert fillers and active agents, can also be provided. For example, inert fillers, such as glass, pumice, etc., and/or active agents, such as vulcanization activators, release agents, antioxidants, inks or other colorants, etc., can be added to the co-processed nanocarbons and carbon black in a matrix before, during, or after the nanocarbon-carbon black loosened aggregates are added to the matrix.

While the invention has been described in detail with reference to preferred embodiments thereof, it will be apparent to those skilled in the art that variations and modifications can be made, and equivalents employed without departing from the scope of the appended claims.

The invention claimed is:

1. A dispersion of carbon fibers and carbon black, comprising:
   carbon black aggregates; and
   carbon fibers, wherein each of the carbon fibers has a cross-section or a diameter of less than 50 nm.

2. The dispersion of claim 1, wherein the carbon fibers consist essentially of multiwalled carbon nanotubes.

3. A dispersion of carbon nanotubes and carbon black, comprising:
   carbon nanotubes, wherein each of the carbon nanotubes is provided from a carbon nanotube aggregation with a bird nest (BN) or a cotton candy (CC) morphology; and
   carbon black aggregates, wherein the carbon black aggregates disperse carbon fibers, wherein the dispersion is free of continuous carbon nanotubes with a diameter of greater than 50 nm.

4. The dispersion of claim 3, wherein the carbon nanotubes consist of multiwalled carbon nanotubes.

5. The dispersion of claim 3, wherein all of the carbon fibers in the dispersion consist of carbon nanotubes with a diameter of less than 50 nm.

6. A method of forming a composition by co-processing nanocarbon aggregates and carbon black aggregates, comprising:
   providing nanocarbon aggregates; and
   co-processing a composition consisting essentially of a total of 100 wt. % of nanocarbon aggregates and carbon black aggregates, wherein co-processing the composition comprises co-processing 50 wt. % or less nanocarbon aggregates and 50 wt. % or more carbon black aggregates, and wherein the co-processing is accomplished by mixing the nanocarbon aggregates and the carbon black aggregates such that individual carbon nanotubes release from said nanocarbon aggregates, as confirmed by electron microscopy.

7. The method of claim 6, wherein the co-processing comprises:
co-processing a total of 100 wt. % of nanocarbon aggregates and carbon black aggregates, wherein 30 wt. % or less nanocarbon aggregates and 70 wt. % or more carbon black aggregates.

8. The method of claim 6, wherein the co-processing comprises:
co-processing a total of 100 wt. % of nanocarbon aggregates and carbon black aggregates, wherein 10 wt. % or less nanocarbon aggregates and 90 wt. % or more carbon black aggregates, and wherein the co-processing the nanocarbon aggregates and the carbon black aggregates comprises co-processing aggregations of carbon nanotubes and carbon black aggregates.

9. A dispersion of carbon fibers and carbon black, comprising:
carbon fiber aggregates; and
carbon black aggregates,
wherein the carbon black aggregates disperse carbon fibers in the carbon fiber aggregates, and
wherein each carbon fiber in the dispersion and each carbon fiber aggregate in the dispersion consists essentially of carbon nanotubes having a cross-section or a diameter of less than 50 nm.

10. A dispersion of carbon fibers and carbon black, comprising:
nanocarbon aggregates; and
carbon black aggregates, wherein the carbon black aggregates disperse the nanocarbon aggregates, wherein the dispersion is free of continuous carbon fibers with a diameter of greater than 50 nm, and wherein the nanocarbon aggregates consist of multiwalled carbon nanotubes with a diameter less than 50 nm in cross-section or diameter.

11. A method of making a nanocarbon-carbon black dispersion, comprising:
providing agglomerated nanocarbons consisting of individual nanocarbons having a cross-section or diameter of less than 50 nm;
providing carbon black; and
mixing the agglomerated nanocarbons with carbon black in an essentially dry state and applying sufficient shear force for a sufficient time to render the agglomerate structure of the nanocarbons unobservable by scanning electron microscope (SEM),
wherein the individual nanocarbons released from said agglomerated nanocarbons due to the shear force as confirmed by electron microscopy, and
wherein the steps of providing agglomerated nanocarbons and providing carbon black consists of providing:
a total of 100 wt. % nanocarbon-carbon black dispersion as 30 wt. % or less agglomerated nanocarbons and 70 wt. % or more carbon black.

12. The method of claim 11, wherein the providing nanocarbon aggregates comprises providing multiwalled carbon nanotube aggregates, and wherein the individual nanocarbons released from said agglomerated nanocarbons consist essentially of multiwalled carbon nanotubes.

13. A composition comprising:
a co-processed material comprising nanocarbons and carbon black; and
a matrix material, wherein the co-processed material is formed by mixing the nanocarbons and carbon black to co-process the mixture into individual nanocarbons having a cross-section or diameter of less than 50 nm observable by electron microscopy and loosened aggregates of nanocarbons and carbon black, and wherein the co-processed material is incorporated within the matrix material, and
wherein the composition comprises:
a total of 100 wt. % of matrix material and co-processed material, wherein the co-processed material comprises 100 wt. % nanocarbons and carbon black with 30 wt. % or less nanocarbons and 70 wt. % or more carbon black.

14. The composition of claim 13, wherein the nanocarbons comprise carbon nanotubes.

15. The composition of claim 13, wherein the co-processed material comprises:
a total of 100 wt. % of nanocarbons and carbon black with 10 wt. % or less nanocarbons and 90 wt. % or more carbon black.

16. The composition of claim 13, wherein the matrix material comprises metal, ceramic, cement, or asphalt.

17. The composition of claim 13, wherein the matrix material comprises an organic polymer.

18. The composition of claim 13, wherein the matrix material comprises rubber.

19. The composition of claim 13, wherein the matrix material comprises a thermoplastic.

20. A mixture of carbon fibers and carbon black, comprising:
carbon fibers aggregates; and
carbon black aggregates,
wherein the carbon black aggregates disperse carbon fibers in the carbon fiber aggregates, wherein all of the carbon fibers in the mixture consist of carbon nanotubes with a cross-section or diameter of less than 50 nm, and
wherein the mixture comprises:
a total of 100 wt. % of carbon fibers aggregates and carbon black aggregates with 30 wt. % or less carbon fibers aggregates and 70 wt. % or more carbon black aggregates.

21. The mixture of claim 20, wherein the carbon nanotubes comprise multiwalled carbon nanotubes.

22. A mixture of carbon nanotubes and carbon black, comprising:
carbon nanotube aggregates resembling a morphology of a bird nest (BN) or a cotton candy (CC); and
carbon black aggregates,
wherein the carbon black aggregates disperse carbon nanotubes in the BN or CC carbon nanotube aggregates, and
wherein the mixture comprises:
a total of 100 wt. % of carbon nanotube aggregates and carbon black aggregates with 30 wt. % or less carbon nanotube aggregates and 70 wt. % or more carbon black aggregates.

* * * * *